(12) United States Patent
Morris et al.

(10) Patent No.: US 7,341,184 B2
(45) Date of Patent: Mar. 11, 2008

(54) METHOD AND SYSTEM FOR PERFORMING SECURITY ON MULTIPLE UNRESOLVED OBJECTS IN A SELF CHECKOUT

(75) Inventors: Charles Morris, Beaconfield (CA); Leslie Williamson, Point Claire (CA)

(73) Assignee: Fujitsu Transaction Solutions, Inc., San Diego, CA (US)

( * ) Notice: Subject to any disclaimer, the term of this patent is extended or adjusted under 35 U.S.C. 154(b) by 180 days.

(21) Appl. No.: 11/054,950

(22) Filed: Feb. 11, 2005

(65) Prior Publication Data

US 2006/0180663 A1 Aug. 17, 2006

(51) Int. Cl.
*G06K 15/00* (2006.01)

(52) U.S. Cl. .................. 235/383; 235/375

(58) Field of Classification Search ........... 235/376, 235/378, 381, 383, 385, 375; 705/16, 23; 186/61; 702/129, 173; 177/50, 25.11
See application file for complete search history.

(56) References Cited

U.S. PATENT DOCUMENTS

| | | | |
|---|---|---|---|
| 4,779,706 A | 10/1988 | Mergenthaler | |
| 4,787,467 A | 11/1988 | Johnson | |
| 5,125,465 A | 6/1992 | Schneider | |
| 5,191,749 A * | 3/1993 | Cappi et al. | 53/502 |
| 5,635,906 A * | 6/1997 | Joseph | 340/572.3 |
| 6,155,486 A * | 12/2000 | Lutz | 235/383 |
| 6,315,199 B1 * | 11/2001 | Ito et al. | 235/383 |
| 6,450,406 B2 * | 9/2002 | Brown | 235/462.45 |
| 6,598,791 B2 | 7/2003 | Bellis, Jr. et al. | |
| 6,857,567 B2 * | 2/2005 | Latimer et al. | 235/383 |
| 2003/0024982 A1* | 2/2003 | Bellis et al. | 235/383 |
| 2005/0040230 A1* | 2/2005 | Swartz et al. | 235/383 |
| 2005/0173527 A1* | 8/2005 | Conzola | 235/385 |

* cited by examiner

*Primary Examiner*—Michael G. Lee
*Assistant Examiner*—Kumiko C. Koyama
(74) *Attorney, Agent, or Firm*—Bingham McCutchen LLP

(57) ABSTRACT

A self-checkout system receives a plurality of objects for the identification of each object in the plurality of objects. The system allows security for a collection of the objects and a subset of the collection of objects to be resolved during a self checkout. In order for security to be resolved on an object, a subset of the collection of objects, or a collection of objects the weight detected on a security scale must be equal to the weight of the object, a sum of a subset weight of the collection, or a sum of the collection weight within a given tolerance. If security is not resolved, the system will prevent an additional object from being recognized by the system until the security for the object is resolved.

12 Claims, 3 Drawing Sheets

METHOD AND SYSTEM FOR PERFORMING SECURITY ON MULTIPLE UNRESOLVED OBJECTS IN A SELF CHECKOUT

BACKGROUND OF THE INVENTION

1. Field of the Invention

The present invention relates to a method, system and computer program product for performing self checkout. More particularly, the present invention relates to a method, system and computer program product for performing self checkout whereby security for a set of objects can be resolved while objects are being added to the set during the self checkout.

2. Description of the Prior Art

Self checkout involves a customer providing objects for purchase to a self checkout system on an object-by-object basis. Typically, as each object is provided to the self checkout system, the self checkout system recognizes each object and monitors a security area to determine whether the correct object has been transferred to the security area. In some systems, additional objects can be provided to, and recognized by, the system for self checkout after it has been determined that an object has potentially been incorrectly transferred to the security area. In these type of self checkout systems, security is resolved at the end of the self checkout by an attendant who performs some type of physical inventory of the security area to either confirm that one or more objects were indeed incorrectly transferred to the security area or determine that there were no incorrect transfer of objects to the security area.

The problem with these types of self checkout systems is that the integrity of the self checkout process is compromised. It is often difficult for the attendant to confirm that one or more wrong objects were incorrectly placed into the security area because so many additional objects were able to be provided to the system after a potential incorrect transfer of an object was signaled.

Other self checkout systems do not allow additional objects to be recognized for self checkout after it has been determined that an object has potentially been incorrectly transferred to the security area. In these types of systems, security must be immediately resolved in order for additional objects to be recognized for self checkout. While these self checkout systems maintain the integrity of security, they have the potential of slowing down the self checkout process.

Accordingly, there is a need for a system, method and computer program product for performing self checkout. There is a need for a system, method and computer program product for performing self checkout whereby security for a set of objects can be resolved during a self checkout. There is a need for a system, method and computer program product for performing self checkout whereby security for a partial set of objects can be resolved during a self checkout. There is need for a system, method and computer program product for performing self checkout whereby security for a partial set of objects can be resolved while objects are being added to the set of objects during a self checkout

SUMMARY OF THE INVENTION

According to embodiments of the present invention, a system, method and computer program product for performing self checkout whereby a set of objects can be recognized and security for the set of objects and a partial set of objects can be resolved ("Collection Resolution") during the self checkout are provided. In order for security to be resolved on an object, a partial set of objects or set of objects the weight detected on a security scale must be equal to the weight of the object, a partial expected weight of any combination of objects in the set, or a combined expected weight of the set of objects. If security is not resolved, the system will prevent an additional object from being recognized by the system until the security for the object is resolved.

BRIEF DESCRIPTION OF THE DRAWINGS

The above described features and advantages of the present invention will be more fully appreciated with reference to the detailed description and appended figures in which.

DETAILED DESCRIPTION OF THE INVENTION

The present invention is now described more fully hereinafter with reference to the accompanying drawings that show embodiments of the present invention. The present invention, however, may be embodied in many different forms and should not be construed as limited to embodiments set forth herein. Appropriately, these embodiments are provided so that this disclosure will be thorough and complete, and will fully convey the scope of the present invention.

According to embodiments of the present invention, a system, method and computer program product for performing self checkout whereby a set of objects can be recognized and security for the set of objects and a partial set of objects can be resolved ("Collection Resolution") during the self checkout are provided. In order for security to be resolved on an object, a partial set of objects, or a set of objects, the weight detected on a security scale must be equal to the weight of the object, a partial sum any combination of expected weights for objects in set of objects, or a combined expected weight of the set of objects. If security is not resolved, the system will prevent an additional object from being recognized by the system until the security for the object is resolved.

Collection Resolution includes determining if a set of objects given to security for resolution ("Security Collection") have been resolved. In an embodiment of the present invention, the number of objects is 1 through N. Typically, the resolution is determined by a security weight scale, but can be any device operable to identify an object based on a characteristic of the object. In an embodiment of the present invention, two objects, such as goods, can be recognized and security for the two objects can be resolved. In an embodiment of the present invention, three objects can be recognized and security for the three object can be resolved. In an embodiment of the present invention, security for a partial set of the set of objects can be resolved ("Partial Resolution") while objects are added to the set during the self checkout. Partial Resolution includes determining if a partial set of the set of objects given to security for resolution ("Partial Collection") have been resolved. Self checkout system 100 allows objects to be recognized while Partial Resolution or Collection Resolution is being performed.

Figure 1:
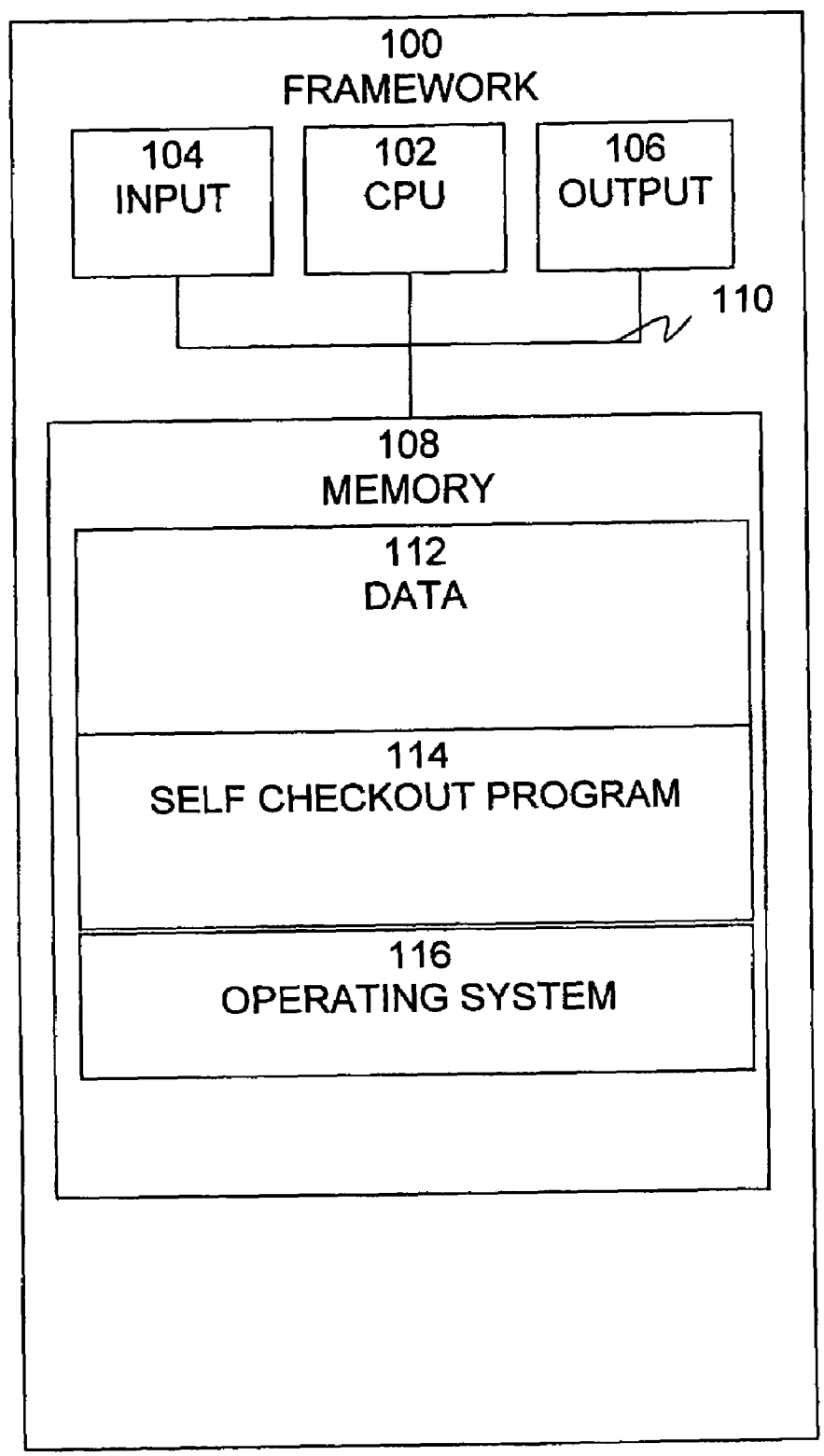
FIG. 1 depicts an exemplary functional block diagram of a system in which the present invention can find application.

FIG. 1 depicts a functional block diagram of a self checkout system in which the present invention can find application. In the embodiment of FIG. 1, self checkout system 100 can be implemented to perform self checkout whereby a set of objects can be recognized and Collection Resolution or Partial Resolution performed. In the FIG. 1 embodiment, self checkout system 100 can be any apparatus that executes program instruction in accordance with the present invention. In an embodiment of the present invention, the self checkout system is belted whereby objects for which security has been resolved are transported mechanically to an area proximate to the self checkout system 100.

In the FIG. 1 embodiment of the present invention, the self checkout system 100 includes a processor (CPU) 102, an input circuitry 104, output circuitry 106, memory 108, data 112, self checkout program 114 and operating system 116. In the FIG. 1 embodiment, the input system 104 is a digital image system. CPU 102 executes program instructions in order to carry out the functions of the present invention. Typically, CPU 102 is a microprocessor, such as an INTEL PENTIUM® processor or AMD® processor. As shown, the CPU 102 and the various other components of the self checkout system 100 communicate through a system bus 110 or similar architecture.

Input circuitry 104 provides the capability to input data and objects to self checkout system 100. For example, input circuitry 104 can include input devices, such as keypad, bill and coin acceptor, coupon detector, credit, debit and EBT detector, scanner, biometric reader, a scanner scale and a security weight scale. Output circuitry 106 provides the capability to output data and objects from checkout system 100. For example, output circuitry 106 can include monitors, printers, coupon dispenser, bill and coin dispensers, and speakers.

Memory 108 stores program instructions that are executed by, and data that are used and processed by, CPU 102 to perform the functions of self checkout system 100. Memory 108 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 108 includes data 112, self checkout program 114 and operating system 116. Operating system 116 can be any operating system that provides overall system functionality in accordance with the present invention. For example operating system can be a Microsoft Window® or UNIX® operating system.

The data 112 can be any data used to perform the functions of the present invention, such as weight values, object identification information for each object in a set of objects, tolerance information and the like. The weight values and object identification information can be stored in a database that is physical or logically connected to self checkout system 100. In an embodiment of the present invention, a set of weight values is associated with each object in the set of objects. In an embodiment of the present invention, the set of weight values for each object in the set of objects can be dynamically updated. For example, a weight value can be added to the database of weight values and associated with a specific object in the set of objects upon the security of the object being resolved. In addition, a weight value for an object can also be deleted from the database of weight values when the addition of a weight value results in the number of weight values associated with the object exceeding a threshold number.

Self Checkout program 114 provides the functionality for performing self checkout whereby a set of objects can be recognized and security for the set of objects and a partial set of the objects in the set of objects can be resolved during the self checkout as executed by CPU 102.

Figure 2:
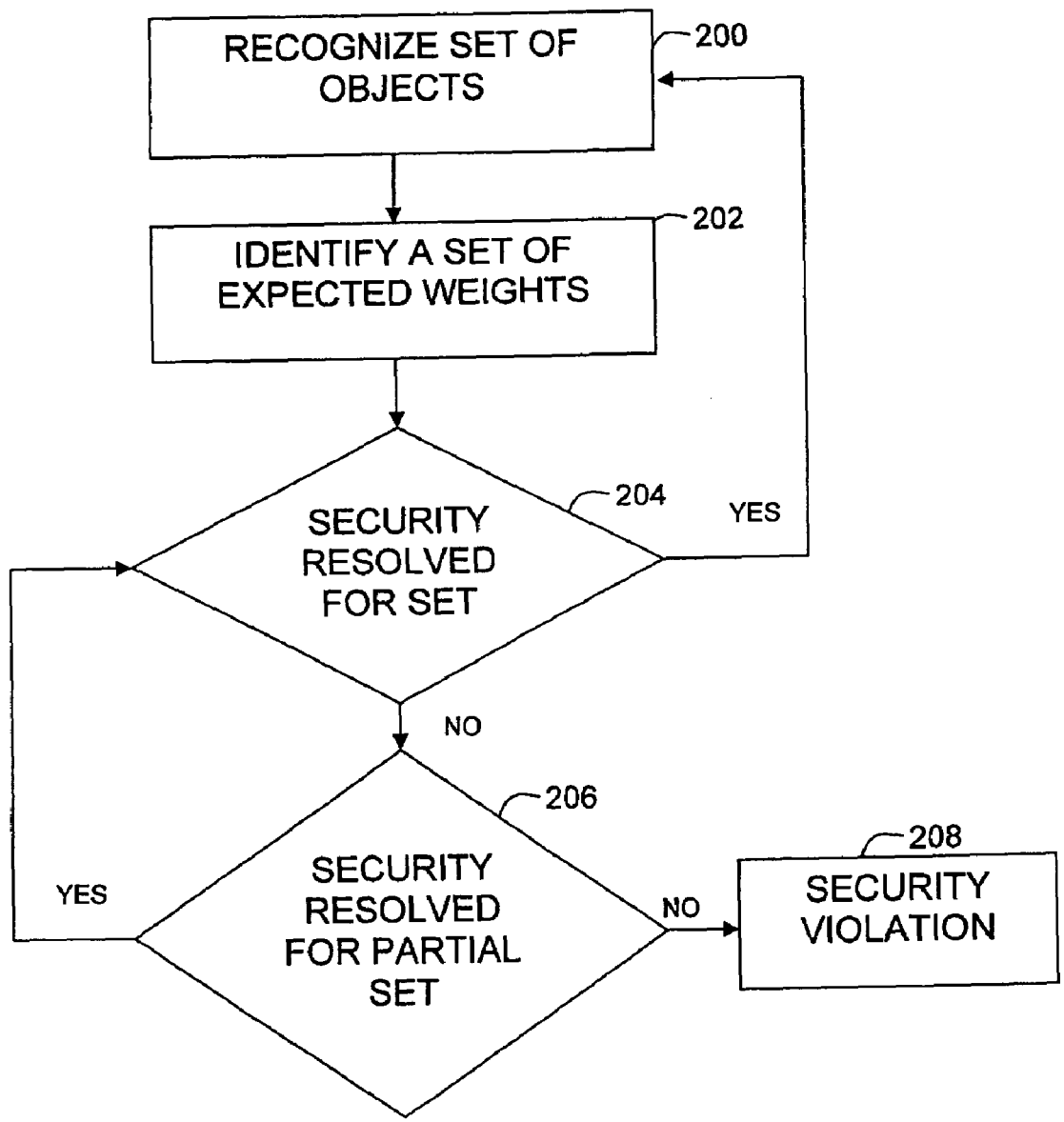
FIG. 2 depicts an exemplary flow diagram of a method of performing self checkout whereby a set of objects can be recognized and security for at least a partial set of objects in the set of objects can be resolved during the self checkout in accordance with the present invention.

FIG. 2 is an exemplary flow diagram of a method of performing self checkout whereby a set of objects can be recognized and security for at least a partial set of objects in the set of objects can be resolved during the self checkout in accordance with the present invention. An object can include an animate object and an inanimate object. In the FIG. 2 embodiment of the present invention, the process begins at step 200, in which a set of objects is recognized. Recognizing the set of objects includes providing objects to self checkout system 100, receiving as input identification information for the objects, and determining that an object is not a new object. For example, the identification information can be received from bar codes on an object. The identification information can be recognized by input circuitry including, but not limited to, bar code scanners and keypad entry.

In an embodiment of the present invention, when a first object is determined to be a new object an additional object provided to the system is not recognized. A weight value detected by the security scale is recorded and associated with the new object and security for the new object is resolved before an additional object can be recognized. Once security for the new object is resolved the system can recognize an additional object.

In an embodiment of the present invention, when there are a set of objects and an object provided to the system is determined to be a new object the new object is not included in the set until security for each object in the set of objects has been resolved. Once security for each object in the set of objects is resolved the weight value for the new object is requested and can be provided using input circuitry, such as a scanner scale.

In step 202, a set of expected weight values for each object in the set of objects is identified. Identifying a set of expected weight values for each object includes searching the database for weight values associated with each object in the set of objects and calculating a set of expected weight values for each object in the set of objects. For example, weight values A1 through A4 can be stored for object A in the set of objects and weight values B1 thought B3 can be stored for object B in the set of objects. The method of calculating the expected weight values for each object in the set of objects is discussed further herein below with respect to FIG. 3. The process proceeds to step 204.

In step 204, it is determined whether security has been resolved for the set of objects. The determination of whether security has been resolved for the set of object includes, but is not limited to, determining whether a weight value is detected on the security scale, determining whether the security scale has increased by a combination of expected weight values for each object in the set of objects within a given tolerance and automatically updating a database with the expected weight values for each object in the set of objects. In an embodiment of the present invention, if a weight value is not detected on the security scale and it is determined that the expected weight value of an object in the set of objects is that of a light object, then the combination of an expected weight value to be detected is the combined expected weight values of the objects in the set without a weight value for the light object. If not, the process proceeds to step 206. If so, the process returns to step 200.

In step 206, it is determined whether security has been resolved for a partial set of object in the set of objects. The determination of whether security has been resolved for a partial set of objects in the set of object includes, but is not limited to, determining whether a weight value is detected on the security scale, determining whether the security scale has increased by a partial sum of a combination of expected weight values for any combination of objects in the set of objects within a given tolerance and automatically updating a database with a percentage of the expected weight values for each object in the partial set of objects. If not, the process proceeds to step 208. If so, the process returns to step 204.

In step 208, a security violation is signaled. The signaling of a security violation prevents an additional object from being recognized by the self checkout system 100. The security violation can be corrected by techniques including, but not limited to, an attendant override and the security weight scale being corrected to reflect an increase by the combination of expected weight values. If security resolution occurs by attendant override the weight value detected by the security scale is added to the weight values associated with each of the objects in the set of objects. In an embodiment of the present invention, after the number of weight values associated with an object reaches a specific number, the addition of a new weight value for that object results in a previous weight value for the object being discarded. The weight value selected to be discarded can be based on factors including, but not limited, age, frequency of use and duplication.

Figure 3:
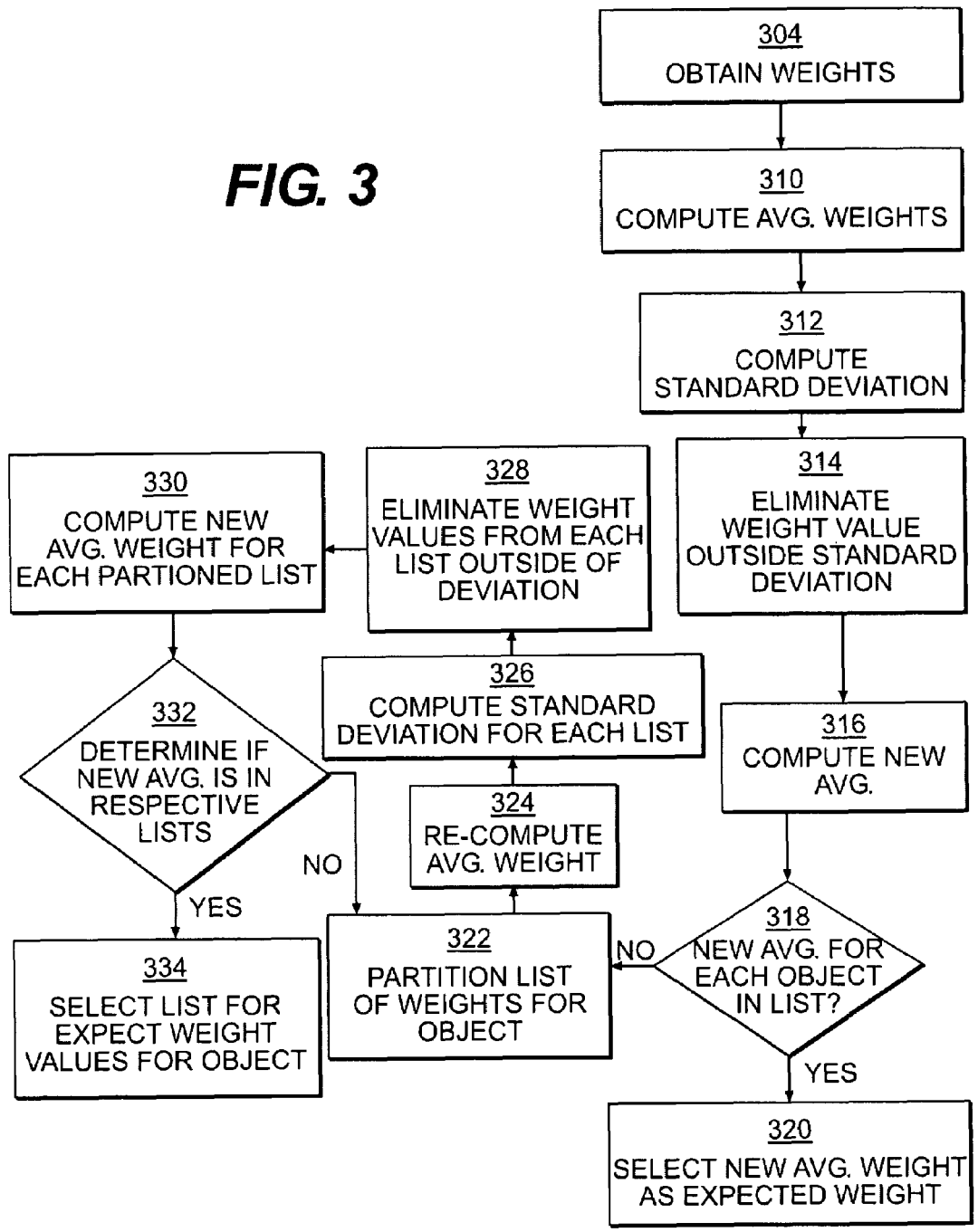
FIG. 3 depicts an exemplary flow diagram of a method of calculating the expected weight values for each object in a set of objects in accordance with the present invention.

FIG. 3 is an exemplary flow diagram of a method of calculating the expected weight values for each object in the set. In the FIG. 3 embodiment of the present invention, the process begins in step 304, in which the weight values for each object in the set of objects are obtained ("original list"). For example, a list of weight values for objects A and B will be obtained from one or more locations, including but not limited to, the database of weight values and a scanner scale. In an embodiment of the present invention, up to N values, such as 24, can be stored for and associated with an object. The process proceeds to step 310.

In step 310, an average weight value (x) is computed for each object in the set of objects using the respective weight values associated with each object. For example, an average weight value (x) will be generated from the list of weight values for objects A and B. The process proceeds to step 312.

In step 312, the standard deviation (d) for the weight values for each object in the set of objects is computed. The process proceeds to step 314. In step 314, the weight values that are outside the standard deviation, such weight values greater than or less than x–d, are eliminated from the list of weights for the object and the remaining weight values are used as the a new list of weight values for the object ("new list"). For example, weight values in each list will be discarded if they are outside the calculated standard deviation and the remaining weight values in each list will constitute the new list of weight values for each object. The process proceeds to step 316.

In step 316, a new average weight value (x') is computed for each object in the set of objects using the respective remaining weight values associated with each object. For example, a new average weight value for each new list of weight values will be generated and stored. The process then proceeds to step 318.

In step 318, it is determined whether the new average weight value (x') for each respective object in the set of objects matches, within a given tolerance, a weight value originally obtained for the respective object in the set of objects. For example, the new average weight value for an object is compared to the weight values originally obtained for the object. If so, then the process proceeds to step 320. For example, the new average weight value for an object matches a weight value in the original list of weight values for the object. If not, then the process proceeds to step 322. For example, the new average weight value for an object does not match a weight value in the original list of weight values for the object.

In step 320, select the new average weight value for a respective object as the expected weight value of the object. This should be done for each object for which a match was found in step 318. In step 322, the original list of weight values for the objects determined to have weight values in step 300 are partitioned at a point corresponding to the new average weight value (x') for each respective object. For example, the original list for an object will be split into two list using the new average weight value for the object as the partition point. The process proceeds to step 324.

In step 324, an average weight value (x) is re-computed for each list of weight values for an object For example, an average weight value (x) will be generated for each partitioned list of weight values for an object. The process proceeds to step 326. In step 326, the standard deviation (d) for the weight values in each list for an object is computed. The process proceeds to step 328. In step 328, the weight values that are outside the standard deviation, such weight values greater than or less than x–d, are eliminated from the list of weights for the object and the remaining weight values are used as the a new list of weight values for the object. The process proceeds to step 330. In step 330, a new average weight value (x') is computed for each list for an object. The process then proceeds to step 332. In step 332, it is determined whether the new average weight value (x') for each respective list of the object is included in the list. The process proceed to step 334. In step 334, the list that has the new average weight value included in the list is selected as the expected weights for the objects.

In step 416 a security violation is signaled. In step 418, it is determined whether a security override has occurred. If so, the process proceeds to step 420. In step 420, a percentage of the weight value detected by the security scale that is in excess of the combined partial sums is added to the weight values associated with each of the objects in the set of objects. In an embodiment of the present invention, after the number of weight values associated with an object reaches a specific number, the addition of a new weight value for that object results in a previous weight value for the object being discarded. The weight value selected to be discarded can be based on factors including, but not limited, age, frequency of use and duplication. Then the process proceeds to step 414. If not, the process returns to step 410.

While specific embodiments of the present invention have been illustrated and described, it will be understood by those

What we claim is:

1. A method for performing security on multiple unresolved objects in a self checkout comprising:
   (a) receiving a plurality of objects for an identification of each object in the plurality of objects;
   (b) detecting a weight value for a collection of objects in the plurality of objects;
   (c) obtaining data for each object in the collection of objects wherein each object in the collection of objects has at least one associated weight data value, and at least one object in the collection of objects has at least two associated weight data values
   (d) calculating an expected weight value for each object in the collection of objects that has at least two associated weight data values;
   (e) determining whether security has been resolved for the collection of objects, as a combined collection of objects, by summing each expected weight value calculated for each object in the collection of objects having at least two associated weight data values and each associated weight data value for each object in the collection having one associated weight data value, comparing the sum to the detected weight value for the collection of objects, and confirming that the comparison of the sum and the detected weight value are within a predetermined tolerance;
   (f) if the comparison of the sum and the detected weight value are within a predetermined tolerance allowing a reception of an additional object for the identification of the additional object;
   (g) otherwise, determining whether security has been resolved for a subset of the collection of objects, as a partial collection of objects, by summing each expected weight value calculated for each object in the subset of the collection of objects having at least two associated weight data values and each associated weight data value for each object in the subset of the collection having one associated weight data value, comparing the sum of subset to the detected weight value for the collection of objects, and confirming that the comparison of the sum of the subset and the detected weight value are within a predetermined tolerance;
   (h) if the comparison of the sum of the subset and the detected weight value are not within a predetermined tolerance signaling a security violation; and
   (i) otherwise, if the comparison of the sum of the subset and the detected weight value are within a predetermined tolerance allowing the reception of an additional object for the identification of the additional object.

2. A method according to claim 1, further comprising scanning each object in the plurality of objects to obtain identification information for each object.

3. A method according to claim 2, further comprising determining that a scanned object is a new object.

4. A method according to claim 3, wherein determining that the scanned object is a new object further includes resolving security for objects in the plurality of objects that have been scanned prior to the new object, and recording a weight value for the new object.

5. A method according to claim 4, wherein determining that the scanned objects is the new object further includes preventing the reception of an object for identification of the object.

6. A method according to claim 5, determining that an object in the plurality of objects is the new object further includes allowing the reception of the object for identification of the object when the weight value for the new object has been recorded.

7. A method according to claim 1, wherein determining whether security has been resolved for the collection of objects includes determining that a security scale has increased by a sum.

8. A method according to claim 1, wherein determining whether security for the partial collection of the objects includes determining that a security scale has increased by a partial sum.

9. A method according to claim 1, wherein signaling a security violation includes prompting a cashier to verify each object in the collection of objects for which security is not resolved.

10. A method according to claim 9, further comprising preventing the reception of an object for identification of the object when a security violation is signaled.

11. A computer program product for performing security on multiple unresolved objects in a self checkout comprising:
    a computer readable medium; and
    computer program instructions, embodied on the computer readable medium, executable by a processor, for performing the steps of:
    (a) receiving a plurality of objects for an identification of each object in the plurality of objects;
    (b) detecting a weight value for a collection of objects in the plurality of objects;
    (c) obtaining data for each object in the collection of objects wherein each object in the collection of objects has at least one associated weight data value, and at least one object in the collection of objects has at least two associated weight data values
    (d) calculating an expected weight value for each object in the collection of objects that has at least two associated weight data values;
    (e) determining whether security has been resolved for the collection of objects, as a combined collection of objects, by summing each expected weight value calculated for each object in the collection of objects having at least two associated weight data values and each associated weight data value for each object in the collection having one associated weight data value, comparing the sum to the detected weight value for the collection of objects, and confirming that the comparison of the sum and the detected weight value are within a predetermined tolerance;
    (f) if the comparison of the sum and the detected weight value are within a predetermined tolerance allowing a reception of an additional object for the identification of the additional object;
    (g) otherwise, determining whether security has been resolved for a subset of the collection of objects, as a partial collection of objects, by summing each expected weight value calculated for each object in the subset of the collection of objects having at least two associated weight data values and each associated weight data value for each object in the subset of the collection having one associated weight data value, comparing the sum of subset to the detected weight value for the collection of objects, and confirming that the comparison of the sum of the subset and the detected weight value are within a predetermined tolerance;

(h) if the comparison of the sum of the subset and the detected weight value are not within a predetermined tolerance signaling a security violation; and (i) otherwise, if the comparison of the sum of the subset and the detected weight value are within a predetermined tolerance allowing the reception of an additional object for the identification of the additional object.

12. A system for performing security on multiple unresolved objects in a self checkout comprising:

a processor operable to execute computer program instructions; and a memory operable to store computer program instructions executable by the processor, for performing the steps of:

(a) receiving a plurality of objects for an identification of each object in the plurality of objects;

(b) detecting a weight value for a collection of objects in the plurality of objects;

(c) obtaining data for each object in the collection of objects wherein each object in the collection of objects has at least one associated weight data value, and at least one object in the collection of objects has at least two associated weight data values (d) calculating an expected weight value for each object in the collection of objects that has at least two associated weight data values;

(e) determining whether security has been resolved for the collection of objects, as a combined collection of objects, by summing each expected weight value calculated for each object in the collection of objects having at least two associated weight data values and each associated weight data value for each object in the collection having one associated weight data value, comparing the sum to the detected weight value for the collection of objects, and confirming that the comparison of the sum and the detected weight value are within a predetermined tolerance;

(f) if the comparison of the sum of the subset and the detected weight value are within a predetermined tolerance allowing a reception of an additional object for the identification of the additional object;

(g) otherwise, determining whether security has been resolved for a subset of the collection of objects, as a partial collection of objects, by summing each expected weight value calculated for each object in the subset of the collection of objects having at least two associated weight data values and each associated weight data value for each object in the subset of the collection having one associated weight data value, comparing the sum of subset to the detected weight value for the collection of objects, and confirming that the comparison of the sum of the subset and the detected weight value are within a predetermined tolerance;

(h) if the comparison of the sum of the subset and the detected weight value are not within a predetermined tolerance signaling a security violation; and (i) otherwise, if the comparison of the sum of the subset and the detected weight value are within a predetermined tolerance allowing the reception of an additional object for the identification of the additional object.

* * * * *